(12) United States Patent
Zhou et al.

(10) Patent No.: US 10,880,116 B2
(45) Date of Patent: Dec. 29, 2020

(54) MULTI MODE INTERFACE AND DETECTION CIRCUIT

(71) Applicant: SKYWORKS SOLUTIONS, INC., Woburn, MA (US)

(72) Inventors: Bo Zhou, Acton, MA (US); Guillaume Alexandre Blin, Carlisle, MA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 0 days.

(21) Appl. No.: 15/657,355

(22) Filed: Jul. 24, 2017

(65) Prior Publication Data

US 2018/0034661 A1    Feb. 1, 2018

Related U.S. Application Data

(60) Provisional application No. 62/439,930, filed on Dec. 29, 2016, provisional application No. 62/367,730, filed on Jul. 28, 2016.

(51) Int. Cl.
*H04L 12/40* (2006.01)
*H04L 12/413* (2006.01)
*G06F 13/40* (2006.01)

(52) U.S. Cl.
CPC .... *H04L 12/40032* (2013.01); *G06F 13/4063* (2013.01); *H04L 12/413* (2013.01)

(58) Field of Classification Search
None
See application file for complete search history.

(56) References Cited

U.S. PATENT DOCUMENTS

| | | | |
|---|---|---|---|
| 8,526,995 B2 * | 9/2013 | Ripley | H04B 1/40 330/307 |
| 8,638,838 B1 * | 1/2014 | Betts | H04L 5/16 326/30 |
| 8,719,459 B2 | 5/2014 | Ripley | |
| 8,791,719 B2 | 7/2014 | Ripley | |
| 9,041,472 B2 * | 5/2015 | Chen | H03F 3/19 330/307 |
| 9,092,393 B2 * | 7/2015 | Whitefield | G06F 13/20 |
| 10,467,154 B2 * | 11/2019 | Mishra | G06F 13/404 |
| 2008/0168196 A1 * | 7/2008 | Hassbjer | H01R 29/00 710/62 |
| 2013/0100993 A1 * | 4/2013 | Ripley | H03L 5/00 375/219 |
| 2013/0135025 A1 * | 5/2013 | Ripley | H03L 5/00 327/306 |
| 2013/0290581 A1 * | 10/2013 | Ruberg | H04L 29/10 710/105 |
| 2016/0050513 A1 * | 2/2016 | Wang | H04W 4/70 340/870.07 |
| 2016/0241213 A1 * | 8/2016 | Zhao | H03G 3/3042 |
| 2016/0242057 A1 * | 8/2016 | Ripley | H04W 24/08 |
| 2017/0220519 A1 * | 8/2017 | Spence | G06F 13/1642 |
| 2018/0034661 A1 * | 2/2018 | Zhou | H04L 12/40032 |

* cited by examiner

*Primary Examiner* — Donald L Mills
(74) *Attorney, Agent, or Firm* — Lando & Anastasi, LLP (57) ABSTRACT

A communication interface circuit includes a plurality of terminals, two receiver circuits, and a detection circuit. The detection circuit is coupled to at least one of the terminals and detects a communication format, and the detection circuit enables one of the two receiver circuits based on the detected communication format.

7 Claims, 10 Drawing Sheets

MULTI MODE INTERFACE AND DETECTION CIRCUIT

CROSS REFERENCE TO RELATED APPLICATIONS

This application claims the benefit under 35 U.S.C. § 119(e) to U.S. Provisional Patent Application No. 62/367,730 filed on Jul. 28, 2016, and to U.S. Provisional Patent Application No. 62/439,930 filed on Dec. 29, 2016, each of which is incorporated herein by reference in its entirety for all purposes.

BACKGROUND

Various electronic systems, such as mixed-signal electronic systems, can include an interface for writing data to and/or reading data from one or more integrated circuits (ICs). The interface typically includes either a serial interface or a parallel interface. For example, a radio frequency system can include a serial peripheral interface (SPI) bus for writing and reading registers of a switch or digital attenuator. As an alternative example, a radio frequency system can implement a parallel general purpose I/O (GPIO) interface. Another alternative interface is the Mobile Industry Processor Interface (MIPI®). The registers may store information to set, for example, a power mode and/or a frequency band of operation of a power amplifier, a termination impedance, a directionality or coupling factor of a coupler, or an antenna selection of an antenna switch module.

Particular interface types include specialized interface circuitry, such that a system implementing a serial interface has a different physical hardware design than a system implementing a parallel interface, for example. Accordingly, if a system designer wishes to provide customers a choice of interface, multiple product versions are conventionally provided, each implementing a different interface. There are significant costs associated with this approach, such as the need for additional semiconductor processing masks, inventory management, additional development costs, schedule delays, etc. Once a designer chooses which interface to provide, the hardware is designed with the chosen interface without the ability to select a different interface type in the future, or at different times, because each interface type may have different inputs and protocols. Yet interface requirements may change in various stages of design or after a design is complete, and various customers may require different interface types for differing applications.

SUMMARY OF THE INVENTION

Aspects and examples are directed to a multi-mode communication interface. In particular, the multi-mode communication interface has capability of detecting a format of data communication by a device connected to the interface. Existing communications interfaces are designed for a particular format of data, which requires manufacturers to design multiple variations of their products to accommodate connectivity to various other devices. The embodiments of the multi-mode communication interface of this disclosure allow a manufacturer to have a reduced number of product designs and allows their customers additional flexibility to use a single product or part across multiple systems or with multiple pieces of equipment. Another benefit of a multi-mode communication interface is that either communication format may be used at any point in time, for example to tune or program the device during production, e.g., with a serial format, and another format may be used, e.g., a parallel format, at a different time, for example when placed into service in a customer's application or product.

According to one aspect, a communication interface circuit is provided and includes a plurality of terminals including a first terminal and a second terminal, a first receiver circuit, a second receiver circuit, and an interface detection circuit. The first receiver circuit is coupled to the plurality of terminals and configured to receive a first communication format. The second receiver circuit is coupled to the plurality of terminals and configured to receive a second communication format. The interface detection circuit is coupled to at least one of the plurality of terminals and coupled to the first receiver circuit and the second receiver circuit. The interface detection circuit is configured to detect the first communication format and the second communication format, and configured to enable at least one of the first receiver circuit and the second receiver circuit based on the detection.

According to an embodiment, the interface detection circuit is configured to detect an impedance or a voltage on at least one of the plurality of terminals. The interface detection circuit may compare a detected impedance or voltage to a threshold or a reference, to detect the first and second communication formats. In some embodiments, the interface detection circuit is configured to detect a frequency on at least one of the plurality of terminals. The interface detection circuit may compare the detected frequency to a threshold, to detect the first and second communication formats In some embodiments the first receiver circuit is configured to receive parallel data communication and the second receiver circuit is configured to receive serial data communication. In embodiments the first communication format may be a parallel data communication format and includes communication via general purpose I/O. The second communication format may be a serial data communication format and may include communication using one or more of a MIPI protocol, SPI protocol, and I2C protocol.

In embodiments, the detection circuit is configured with a bias toward enabling one of the receiver circuits. In embodiments, the detection circuit is configured to enable one of the first receiver circuit and the second receiver circuit when the detection is uncertain. In some embodiments the detection circuit is configured with a delay, the delay enforcing an amount of time the detection must remain unchanged before the detection circuit enables one of the first receiver circuit and the second receiver circuit based on the detection.

According to another aspect, a module is provided that includes a communication interface circuit according to any of the above described embodiments.

According to another aspect, a wireless device is provided that includes a communication interface circuit according to any of the above described embodiments and is configured to send and receive electromagnetic signals.

According to another aspect, a digital interface detection circuit is provided that includes an input connection, a detector configured to determine whether a signal received at the input connection is associated with a first communication format or a second communication format, and an output connection connectable to a first receiver circuit associated with the first communication format and a second receiver circuit associated with the second communication format, to enable one of the first receiver circuit and the second receiver circuit based on the determined communication format.

In some embodiments, the detector includes at least one of an impedance detector, a frequency detector, and a voltage level detector to determine whether the signal received at the input connection is associated with the first or second communication format. The detector may be configured to compare a detected impedance, frequency, or voltage level to a threshold to determine whether the signal received at the input connection is associated with the first or second communication format. The detector may be configured to compare a voltage level on the input connection to a reference voltage level.

In embodiments, the first communication format may be a parallel communication format and the second communication format may be a serial communication format. A parallel data communication format may include communication via general purpose input/output. A serial data communication format may include communication with one of a MIPI protocol, SPI protocol, or I2C protocol.

In some embodiments the output connection is configured to enable at least one of the first receiver circuit and the second receiver circuit when the detection is uncertain. The output connection may be configured with a bias toward enabling one of the first receiver circuit and the second receiver circuit. The detector may be configured with a delay, the delay enforcing an amount of time the determined signal format must remain unchanged before the output connection enables one of the first receiver circuit and the second receiver circuit based.

According to another aspect, a module is provided that includes as interface detection circuit according to any of the above described embodiments.

According to another aspect, a wireless device is provided that includes an interface detection circuit according to any of the above described embodiments and is configured to send and receive electromagnetic signals.

According to another aspect, a method of communicating between a first device and a second device is provided and includes monitoring at least one terminal of a plurality of terminals; detecting at least one of an impedance, a frequency, and a voltage level on the at least one terminal; and enabling one of a first receiver circuit and a second receiver circuit based on the detection.

In some embodiments, the first device provides the impedance, frequency, or voltage level. In certain embodiments, the method includes receiving a data communication by the enabled receiver circuit. The second device may receive the data communication by one of the first receiver circuit and the second receiver circuit.

The first receiver circuit may be configured to receive parallel data communication and the second receiver circuit may be configured to receive serial data communication. The first receiver circuit may be configured to receive parallel data communication via general purpose I/O. The second receiver circuit may be configured to receive serial data communication using one or more of a MIPI protocol, SPI protocol, and I2C protocol.

According to some embodiments, detecting the impedance, frequency, or voltage level includes comparing the impedance, frequency, or voltage level to a threshold. Detecting an impedance may include comparing a voltage level to a reference voltage level.

In some embodiments, enabling one of a first receiver circuit and a second receiver circuit based on the detection includes enabling at least one of the first receiver circuit and the second receiver circuit when the detection is not certain; and in some embodiments enabling one of a first receiver circuit and a second receiver circuit based on the detection includes enforcing an amount of time the detection must remain unchanged before enabling one of the first receiver circuit and the second receiver circuit based on the detection.

According to another aspect, a module is provided that performs the method according to any of the above described embodiments.

According to another aspect, a wireless device is provided that performs the method according to any of the above described embodiments and is configured to send and receive electromagnetic signals.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects of the present disclosure are directed to communication interfaces capable of detecting the data communication format of a device connected to the interface. These multi-mode communication interfaces may provide, for example, flexibility in part inventories as the designs incorporating the multi-mode communication interface are adaptable to multiple other pieces of equipment, reduce costs in inventory and in product development, and may have greater desirability to manufacturers who use the component products in commercial devices. In accordance with an aspect of the present disclosure, the multi-mode communication interface may be provided with no additional I/O pins than those used for a parallel interface alone. The data communication format may be detected by a detection circuit that monitors signals on the interface and enables various receivers or transceivers based upon the detected format.

The multi-mode communication interfaces disclosed herein include, in some examples, a detection circuit that detects the presence of a clock signal, a DC voltage, and/or an impedance, on one or more terminals of the communication interface, any of which may indicate a format of communication sent to the interface. For example, clock detection may include monitoring for an expected clock frequency above or below a threshold. DC threshold detection may include monitoring for a DC voltage signal, e.g., above or below a threshold, that indicates a particular communication format. Impedance detection may include monitoring for an unused or electrically free-floating line, e.g., in a high impedance state, which may indicate a communication format. In each case, the presence of a clock signal, a DC voltage, and/or an unused or high-impedance line may indicate that a connected device is communicating in either of a serial or a parallel communications format. In embodiments, upon detecting the format, the detection circuit enables a receiver, or a transceiver, designed to receive the detected format.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

In accordance with some embodiments hereof, the present disclosure relates to a multi-mode communication interface that can be used to provide both a serial communication interface and a parallel communication interface within a single digital control interface die. For example, a MIPI® radio frequency front end (RFFE) serial interface and a three-pin general purpose input/output (GPIO) interface may be provided on a single die within a front end module. In certain embodiments, the multi-mode communication interface, or digital control interface, can communicate with a power amplifier, a coupler, an antenna switch module, or any other suitable component or combination of components. Further, the multi-mode communication interface can be used to set the mode of any of these or other suitable components. As indicated above, these aspects of the multi-mode communication interface may be combined with other aspects to further improve the performance of components, modules, and the devices in which they are employed.

When a new standard is introduced, or an existing standard is modified, it is often necessary to introduce new components or modify existing components to take advantage of the new or updated standards. For example, the adoption of the MIPI® RF Front End (RFFE) standard serial interface for supporting multiple configuration modes within a module, such as a power amplifier module, may mean that device manufacturers who wish to support the new standard may need to use a new front end component that supports the RFFE standard. Manufacturers of the front end components who have customers using the RFFE standard and customers using a different standard, such as the General Purpose Input/Output (GPIO) interface may often manufacture two separate components. This can be costly because, for example, more time and human resources must be expended to produce both types of front end devices.

Further, device manufacturers who wish to support both standards may often be required to redesign their products to fit two or more components to support the standards. Not only may this require more physical space, but it may also result in greater power consumption because, for example, the multiple interface components may each consume power.

Advantageously, embodiments of the present disclosure provide a system and method for implementing multiple standards in a single die without increasing the size of the die, or the number of pins required to support the front end interfaces. Further, in some embodiments, power consumption is not increased compared to devices that use components that implement a single interface standard. Moreover, embodiments of the present disclosure provide a single interface component, or die, to support the RFFE serial interface, the GPIO interface, or both interfaces without any modifications to existing devices. In certain implementations, the size and the pin count of the single interface component may be kept the same as a die that implements only one of the RFFE interface and the GPIO interface.

Figure 1:
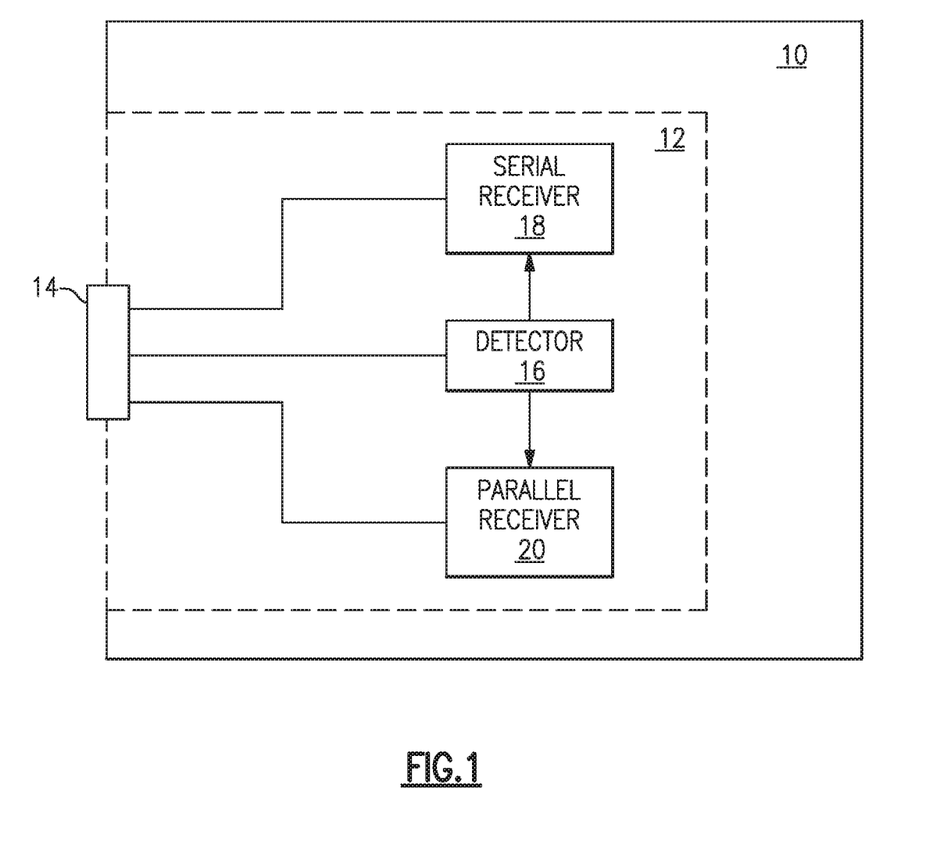
FIG. 1 is a block diagram of an example of a multi-mode communication interface.

Shown in FIG. 1 is an example embodiment of a device 10 having a communication interface 12 capable of supporting multiple communication formats. The communication interface 12 includes one or more terminals 14 to which one or more other devices may be electrically connected to communicate data and/or control information with the device 10. The other device or other devices may communicate with the device 10 in a serial format or a parallel format. The communication interface 12 further includes a detector 16 that detects which communication format is being used and selectively enables a serial receiver circuit 18 or a parallel receiver circuit 20. In various embodiments, the serial receiver circuit 18 and the parallel receiver circuit 20 may each be one of a receiver, a transmitter, or a transceiver. Additionally, the detector 16 may enable or disable additional receivers, transmitters, or transceivers based on the detected communication format. In certain examples, there may be three terminals 14 but other embodiments may include more or fewer terminals. Additionally, in certain examples some of the terminals 14 may connect directly to both the serial receiver circuit 18 and the parallel receiver circuit 20, while some of the terminals 14 may connect to only one of the serial receiver circuit 18 or the parallel receiver circuit 20, or any combination. As one example, a switching circuit may be provided that selectively disconnects various of the terminals 14 from either the serial receiver circuit 18 or the parallel receiver circuit 20 at various times, such as when the various terminals 14 are not in use or when the terminals 14 are being used by another interface.

When another device communicates with the device 10 in a serial format, there is typically a clock (CLK) signal that provides timing information and a data (DATA) signal that provides encoded data being communicated. When the detector 16 detects that communication is being received in a serial format, the operation of which is described in more detail below, the detector 16 enables the serial receiver circuit 18 and the serial receiver circuit 18 receives the clock and data signals. Example serial data communications formats include at least the MIPI, SPI, and I2C protocols, among others.

When another device communicates with the device 10 in a parallel format, there are multiple lines, e.g., three, that may be General Purpose Input/Output (GPIO) lines to communicate data and/or control information. When the detector 16 detects that communication is being received in a parallel format, again the operation of which is described in more detail below, the detector 16 enables the parallel receiver circuit 20 and the parallel receiver circuit 20 receives the various GPIO signals.

As discussed above, the detector 16 detects the format of the communication of another device communicating with the device 10 and indicates to the serial receiver circuit 18 or the parallel receiver circuit 20 which of them should be enabled to participate in the communication.

Figure 2A:
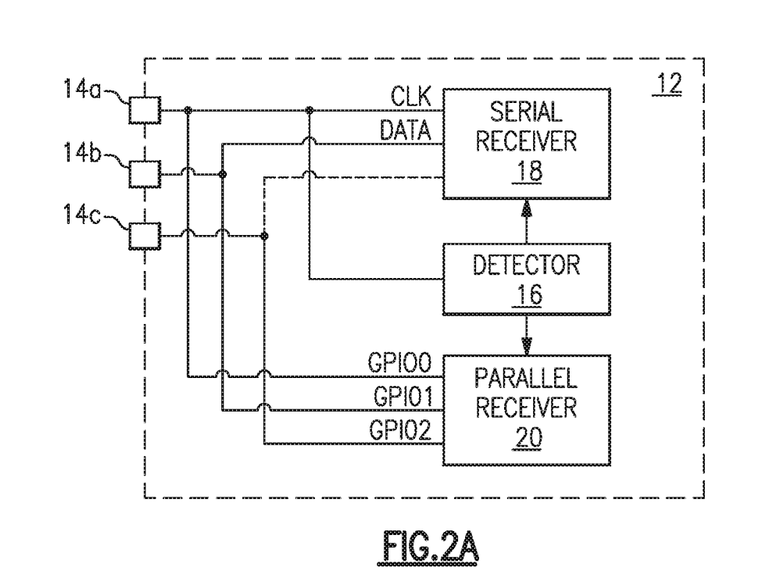
FIG. 2A is a block diagram of the communication interface of FIG. 1 configured to detect a clock signal.

When communication occurs in a serial format, a clock signal typically has a fixed frequency, and is typically a square wave, to provide a reference clock. By contrast, data signals, whether in the serial format or the parallel format, are typically changing in a non-constant manner because they are conveying binary data. A clock signal for a serial communication is also typically of a higher frequency than the data signals of a parallel communication, though this is not always the case. Because of these distinctions, the detector 16 may distinguish a serial communication format from a parallel communication format by detecting whether a clock signal exists on at least one of the communication lines, e.g., terminals 14. One example is shown in FIG. 2A, wherein the detector 16 is connected to monitor for a clock signal received via terminal 14a, which may indicate a received communication in a serial format.

In some embodiments, the serial communication directed to the device 10 will have a clock with a frequency higher than the frequencies present in a parallel communication. Accordingly, the detector 16 in the example of FIG. 2A may include a frequency detector, or frequency counter, that determines whether the signal on terminal 14a has a frequency above or below a certain threshold. If the signal frequency present on terminal 14a is higher than the threshold frequency, the communication format is detected to be a serial format and the serial receiver circuit 18 is enabled. If the signal frequency present on terminal 14a is lower than the threshold frequency, the communication format is detected to be a parallel format and the parallel receiver circuit 20 is enabled. For example, many serial interfaces operate with a clock signal in a mega-hertz (MHz) frequency range. Accordingly, a sufficient threshold frequency to determine the presence of a clock signal may be 100 kHz. If a frequency above 100 kHz is detected, such may suffice to determine that a clock is present and the detector 16 may thereby enable the serial receiver circuit 18. If no signal is detected with a frequency above 100 kHz, the detector 16 may determine that no clock signal is present and thereby enable the parallel receiver circuit 20.

Examples of a frequency detector or frequency counter may include a circuit that has an accumulator or an edge trigger and counts the number of cycles in an input signal over a period of time, or may measure the amount of time between two cycles or two edges to determine the frequency. These and other arrangements of circuits that may count or detect frequency are known in the art.

Continuing with the example threshold of 100 kHz, such a clock signal will have a 10 uSec cycle duration. If the detector 16 is configured to detect frequency by measuring pulse duration or cycle time, cycles of duration shorter than 10 uSec may indicate a frequency higher than 100 kHz and therefore indicate the presence of a clock signal, and the detector 16 may enable the serial receiver circuit 18. Cycles longer than 10 uSec may indicate a frequency lower than 100 kHz and therefore indicate that no clock signal is present, and the detector 16 may enable the parallel receiver circuit 20.

As discussed above, the clock signal may be received on any of the terminals 14 and accordingly, in embodiments, the detector 16 may be configured to monitor the signal on any one of the terminals 14, or multiple ones of the terminals 14.

In embodiments, the clock frequency of a serial communication may be higher or lower than in other embodiments, and the clock frequency of a serial communication may be higher or lower than the frequencies used by a parallel communication, depending upon operational parameters, and thus the threshold frequency in any given embodiment may be different or may be selectable or programmable. Specifically, according to other embodiments, the clock frequency of a serial formatted communication may be lower than the frequencies in an anticipated parallel communication, and in such a case the detector 16 could be configured to enable the parallel receiver circuit 20 when the detected frequency is higher than the threshold frequency and to enable the serial receiver circuit 18 when the detected frequency is lower than the threshold frequency.

Figure 2B:
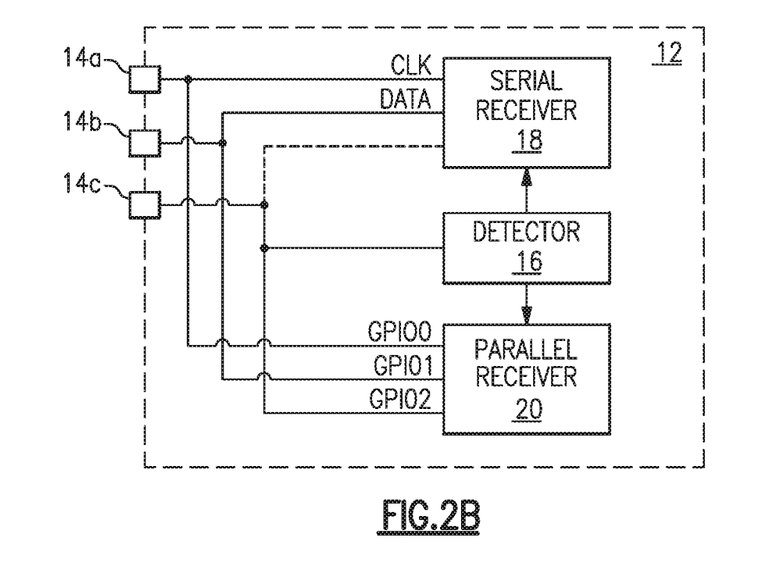
FIG. 2B is a block diagram of the communication interface of FIG. 1 configured to detect a terminal impedance.

An alternate method of detecting the communication format involves the variation in signal levels for the cases of serial communication versus parallel communication. For example, and as illustrated in FIG. 2B, one of the terminals 14, e.g., terminal 14c, may be unused by one of the interface circuits, e.g., the serial receiver circuit 18. In the example case of terminal 14c not being used during serial communication, the terminal 14c may be free floating, unconnected, or otherwise held at a high impedance when a serial device is communicating with the device 10. When the terminal 14c is used to convey data, as in the case of parallel communication, the signal provided via terminal 14c will have definitive voltage levels, e.g., high or low, to indicate binary data. In either case, a distinction may be made by the signal level (or lack thereof) on terminal 14c. Accordingly as shown in FIG. 2B, the detector 16 is configured to monitor terminal 14c to detect whether it is in a high impedance or free-floating state, which may indicate that a serial communication format is in use. In certain examples, when in a high impedance state terminal 14c may have a voltage in the range of about 0.5 to 2 volts. Accordingly, in certain examples the detector 16 may be configured to detect the voltage on terminal 14c and if it is below 0.5 volts or above 2 volts, the detector 16 may determine that a parallel communication format is in use and enable the parallel receiver circuit 20. If the voltage on terminal 14c is instead between the range of 0.5 to 2 volts, the detector 16 may determine that a serial communication format is in use and enable the serial receiver circuit 20.

Figure 3A:
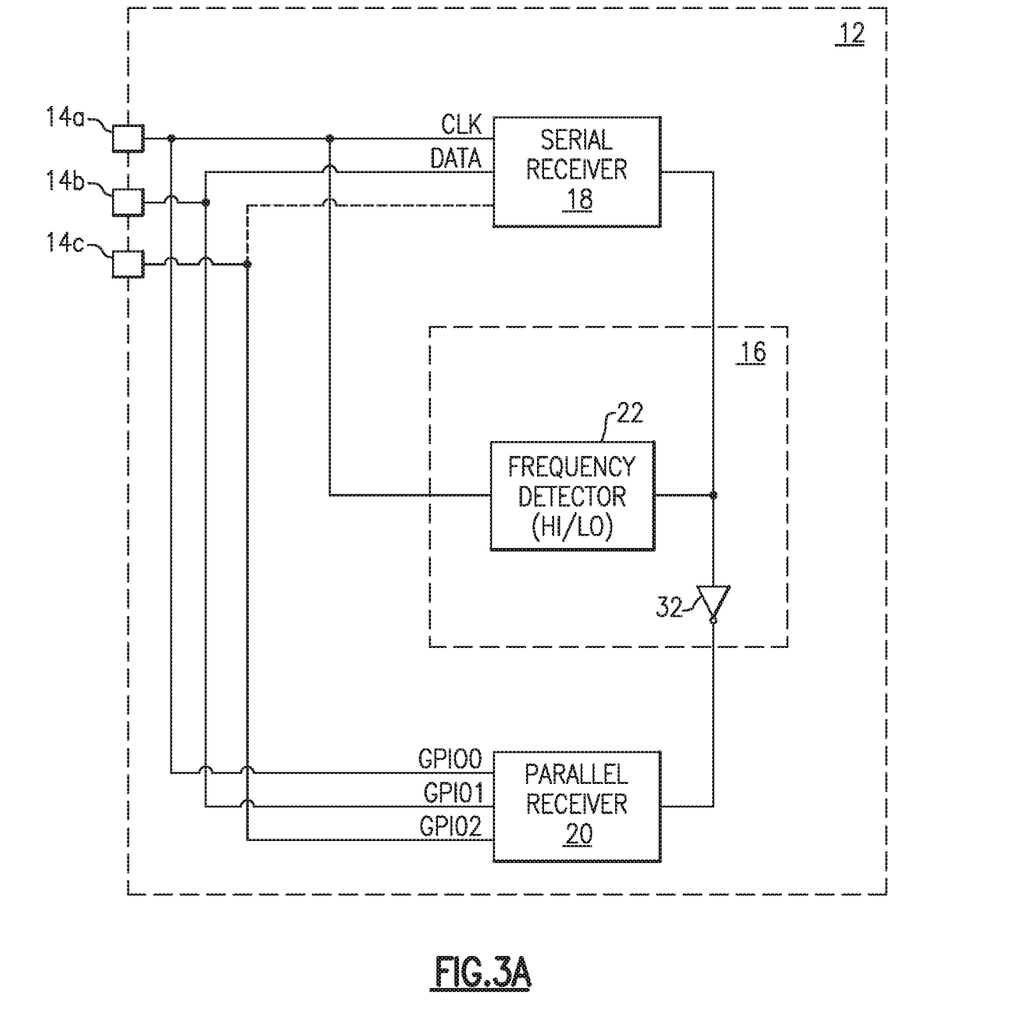
FIG. 3A is a block diagram of an example of a multi-mode communication interface.

A more specific example of a multi-mode communication interface 12 is illustrated in FIG. 3A, wherein the detector 16 is coupled to a terminal on which a clock signal may be expected if a communication is being received in a serial communication format. The detector 16 includes a frequency detector 22 to determine whether a clock signal is present on the respective terminal, e.g., terminal 14a in this example. The detector 16 detects a clock signal by the frequency detector 22 comparing a detected frequency to a threshold frequency, and outputs an enable signal to the serial receiver circuit 18 if the comparison indicates a serial clock is present. The detector 16 may also include an inverter 32 to disable the parallel receiver circuit 20 when the serial clock is present. If no serial clock is detected by the frequency detector 22, the serial receiver circuit 18 is disabled and the parallel receiver circuit 20 is enabled. In other embodiments, the detector 16 may use other methods of detecting a serial clock in addition to or instead of detecting frequency and comparing to a threshold. For example, the detector 16 may monitor the clock terminal, e.g., terminal 14a, for a square wave, for a repetitive pattern, or for a narrow bandwidth signal, to determine the presence of a clock signal, or any combination of these and other signal features may be used to determine the presence of a clock signal. For example, an analog signal with changing spectral parameters may be determined to not be a serial clock signal, for instance. Those of skill in the art, with the benefit of this disclosure, will recognize additional signal features that may be used to determine the presence of a serial clock signal, and such signal features may vary or depend upon changing operational parameters or application.

Figure 3B:
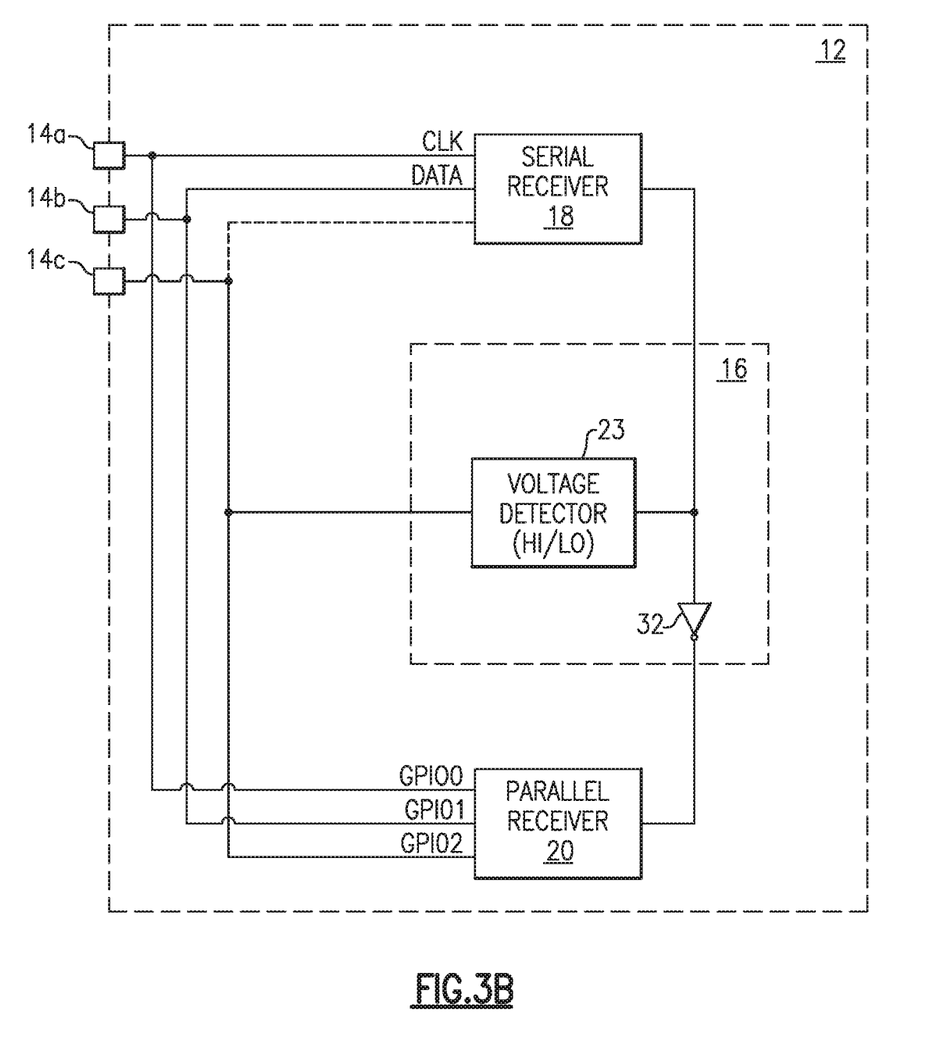
FIG. 3B is a block diagram of another example of a multi-mode communication interface.

Another example of a multi-mode communication interface 12 is illustrated in FIG. 3B, wherein the detector 16 is coupled to a terminal on which a particular voltage or range of voltages may be expected depending upon what communication format is in use. The detector 16 includes a voltage detector 23 to detect a voltage on one of the terminals, e.g., terminal 14c in this example. As discussed above, a voltage on the respective terminal, e.g., terminal 14c, may be between 0.5 and 2 volts, for example, when the communication format is of a nature that doesn't use the terminal, e.g., a serial communication format. Accordingly, if the voltage is below 0.5 volts or above 2 volts, such may indicate that the terminal is carrying data, and therefore that the communication format is of a nature that uses the terminal, e.g., a parallel communication format. The voltage detector 23 therefore may compare the voltage on the terminal to one or more thresholds, e.g., 0.5 volts and 2 volts, to determine which receiver circuit to enable.

Figure 3C:
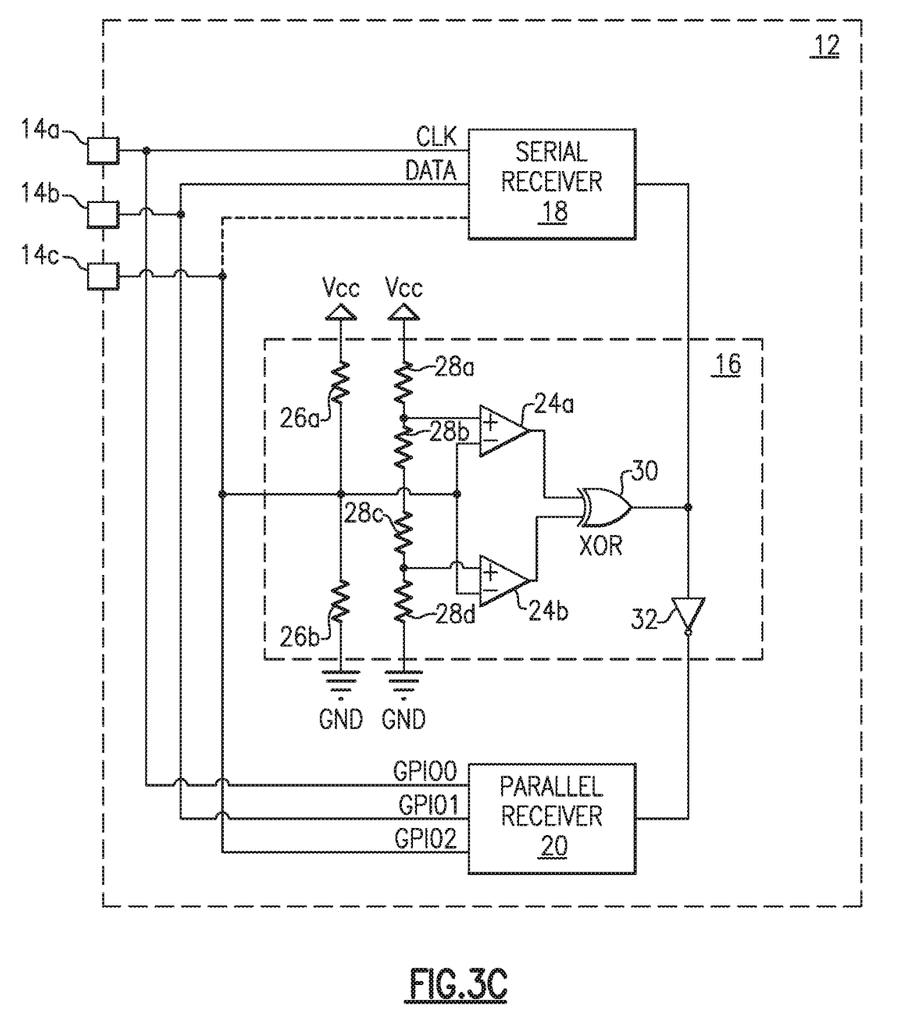
FIG. 3C is a block diagram of another example of a multi-mode communication interface.

Another example of a multi-mode communication interface 12 is illustrated in FIG. 3C, wherein the detector 16 detects a high impedance or unused terminal. In this example, a serial communication format may not use terminal 14c and the terminal 14c may therefore be held to a high impedance state when a serial communication format is in use. A parallel communication format may use terminal 14c and may provide a voltage or other signal to terminal 14c. As shown in FIG. 3C, the detector 16 includes two comparators 24a and 24b, a voltage divider 26 including resistors 26a and 26b, and a voltage divider 28 including resistors 28a, 28b, 28c, and 28d. The resistors of voltage divider 28 may all be of equal resistance values and are connected such that comparator 24a receives a reference voltage that is ¾ of a supply voltage (denoted as Vcc) at its non-inverting input terminal and such that comparator 24b receives a reference voltage that is ¼ of the supply voltage at its non-inverting input terminal. The resistors 26a, 26b of voltage divider 26 may all be of equal resistance values and are connected such that terminal 14c will be held at a voltage that is ½ of the supply voltage in the absence of any external voltage or signal applied to terminal 14c. The comparators 24 are further connected to compare the voltage at terminal 14c to their respective reference voltages, and the output of the comparators 24 are connected to an exclusive OR (XOR) logic gate 30 that will yield a low output if the two comparator 24 outputs match (i.e., both high or both low) and will yield a high output if the two comparator 24 outputs don't match.

With continuing reference to the detector 16 of FIG. 3C, in the case of serial communication, the terminal 14c may be disconnected externally or may otherwise present a high impedance from the perspective of the interface 12. In this case, the voltage divider 26 will hold the terminal 14c at a voltage that is ½ of the supply voltage. As a result, the output of the comparator 24a will be high and the output of the comparator 24b will be low. Accordingly, the XOR logic gate 30 will output a high signal which may enable the serial receiver circuit 18. The output of the XOR logic gate 30 is also shown connected to the parallel receiver circuit 20 through an inverter 32, thus the parallel receiver circuit 20 will see a low signal which may disable the parallel receiver circuit 20. In various embodiments, the reference voltages may differ, the expected voltage level on the terminal 14c may differ, or a particular voltage level on the terminal 14c may be interpreted to have various meanings.

In the case of parallel communication, terminal 14c will receive a data signal which will pull the voltage on terminal 14c either high or low, depending upon the binary data being received, and can effectively override the voltage divider 26. When the voltage at terminal 14c is high, the output of both the comparators 24 will be low. When the voltage at terminal 14c is low, the output of both the comparators 24 will be high. In this manner, the outputs of both the comparators 24 will be identical to each other when communication is occurring in a parallel format. Accordingly, the output of the XOR logic gate 30 will be low, which may disable the serial receiver circuit 18, and the parallel receiver circuit 20 will see a high signal via inverter 32, which may enable the parallel receiver circuit 20.

In one or more embodiments, it may be desirable for the detector 16 not to change the determined communication format frequently. In such embodiments, a hold circuit or latch may be included that, in operation, holds one of the receiver circuits in the enabled state for at least a minimum amount of time. Alternatively, when a detected communication format changes, the detector 16, or a hold or latch circuit provided therewith, may delay changing the enabled receiver circuit until the changed communication format is continuously detected for a period of time. This prevents bouncing between detected modes in the case of, e.g., a transient change such as, for example, connecting a new device to the interface 12 or changing the mode of a connected device, or when the signals received do not yet clearly indicate which communication format is in use. Further in various embodiments, the detector 16 may include a bias toward one communication format or the other. For example, if the signals received on one or more of the terminals 14 do not clearly indicate which communication format is in use, the detector 16 can be configured to enable the parallel receiver circuit 20 by default (or may be configured to enable the serial receiver circuit 18 by default). In various embodiments, the detector 16 may be configured to enable the parallel receiver circuit 20 upon determining that communication is in a parallel mode, and hold the parallel receiver circuit 20 in an enabled condition continuously until such time as a serial communication format is affirmatively detected, e.g., a threshold for determining that communication is in a serial mode may be set such that changing to the serial mode requires a greater certainty that the communication being received is in fact in a serial format.

As discussed above, embodiments of the present disclosure present a number of options for the configuration, operation, and connection of a detector 16. In various embodiments, a detector 16 may use any one of these options or may use multiple of these options at the same time. For example, a detector 16 may monitor one or all of the terminals 14 for a clock signal while also monitoring one or all of the terminals 14 for a high impedance. In such a manner, if multiple options (or approaches) indicate the same communication format, it may be more certain that the detector 16 has correctly determined the communication format. If multiple approaches to detection indicate different communication formats, the detector 16 may be configured to enable one of serial receiver circuit 18 or parallel receiver circuit 20 by default. For example, if multiple approaches to detection indicate different communication formats, parallel receiver circuit 20 may be enabled by default. Further, parallel receiver circuit 20 may remain enabled until such time as all approaches to detection indicate a serial format, for example.

In at least one embodiment, the detector 16 may be configured to monitor for a particular signaling or training sequence to determine which interface to enable. For example, a connected device may indicate to the interface 12 whether it will communicate in a serial or parallel communication format by first sending a training sequence or signaling sequence. In such an embodiment, the detector 16 may determine with a high degree of certainty which receiver to enable. Additionally, the detector 16 may continue to monitor for a signaling or training sequence, so a connected device may switch between serial and parallel communication by transmitting the proper sequence indicating the change. Again, the detector 16 may then determine a new communication format with a high degree of certainty. In some embodiments, the detector 16 may be configured to maintain an established communication format (i.e., maintain the enabled receiver) until such time as the detector 16 detects a received sequence indicating a new communication format should be detected, and the new communication format may itself be indicated by the sequence.

Figure 4A:
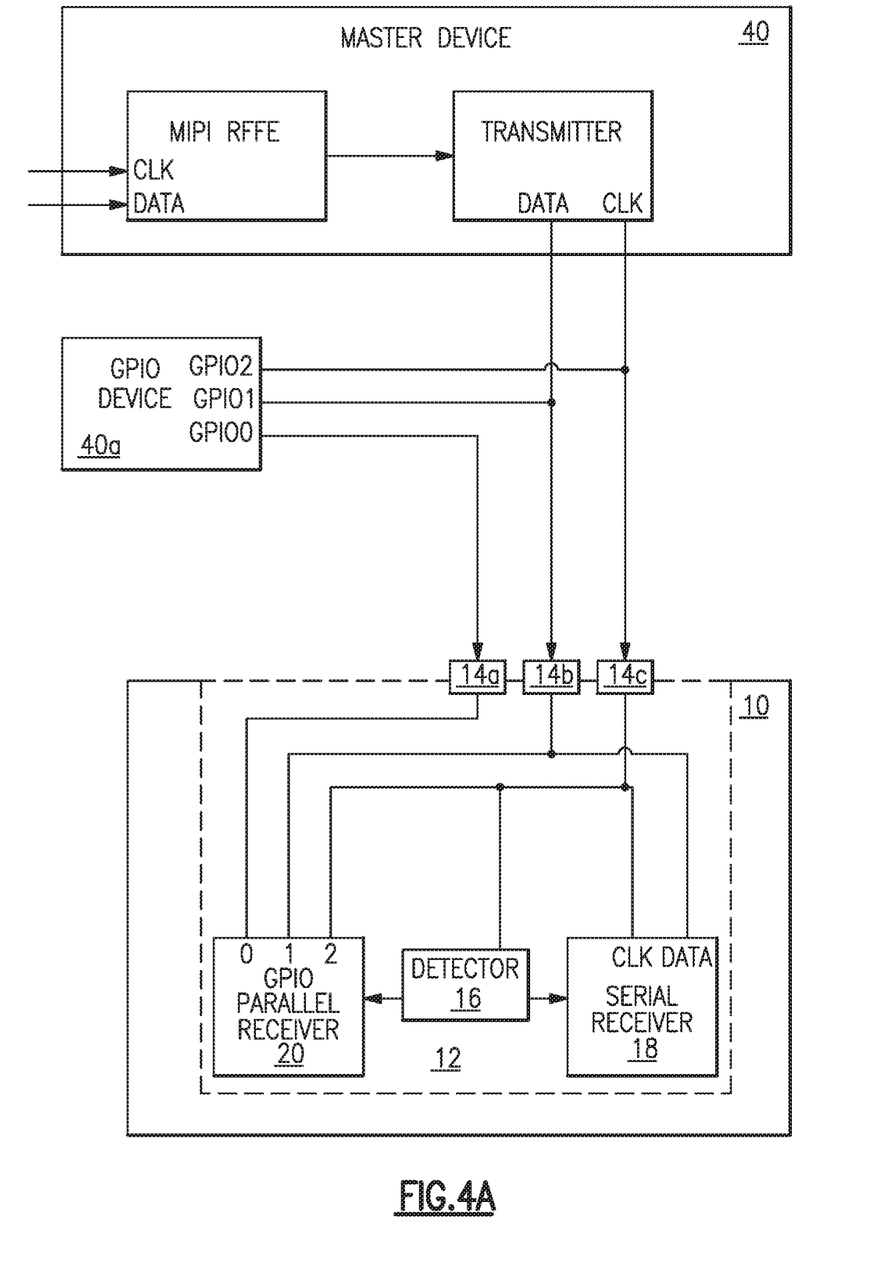
FIG. 4A is a block diagram illustrating a use case scenario of a component including a multi-mode communication interface.

With reference to FIG. 4A, an example of a use case for the multi-mode interface 12 is illustrated. A device 10 is shown with the interface 12 (and terminals 14) connected to a master device 40 that will communicate with and control the device 10 using a serial format. In certain examples, the master device 40 may be a trimming or programming device, e.g., to establish initial register values, to program the device 10 prior to shipping the device 10 to a customer. When placed in service, a different device 40a may be in communication with the device 10, via the interface 12, for regular operation. In certain examples, the device 40a and the device 10 may be sold together as one unit, or may be combined in one package. For example, the device 40a may be a baseband subsystem that controls device 10, which may be an amplifier. The device 40a may communicate with the device 10 using a parallel communication format, as illustrated in FIG. 4A. The master device 40, however, may be coupled to the interface 12 at the factory, for initial programming as discussed above, and may communicate with the device 10 using a serial communication format. Interface 12 enables this functionality by detecting which communication format is being used, by the detector 16, and enabling the appropriate one of either the serial receiver circuit 18 or the parallel receiver circuit 20. In the example shown in FIG. 4A, the detector 16 is coupled to the terminal 14c which may, in this example, be the terminal upon which a clock will be received when communication occurs in a serial format. Accordingly, the detector 16 of FIG. 4A may be a clock or frequency detector.

Figure 4B:
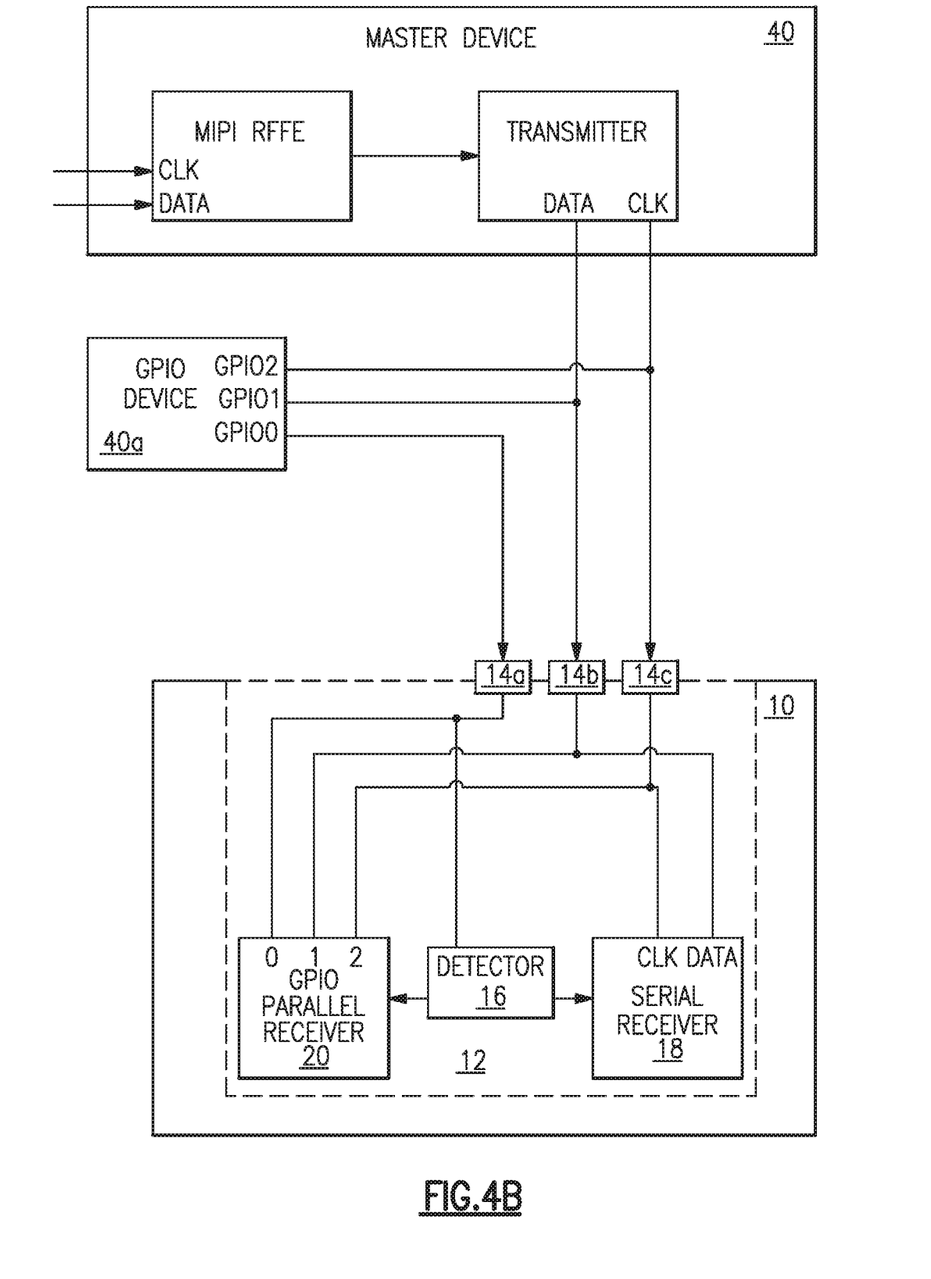
FIG. 4B is a block diagram illustrating another use case scenario of a component including a multi-mode communication interface.

FIG. 4B illustrates the same environment as that shown in FIG. 4A except that the detector 16 in FIG. 4B couples to the terminal 14a. Terminal 14a is expected to be unused for serial communication. The detector 16 of FIG. 4B therefore may detect, for example, a voltage or a high-impedance state on terminal 14a, as discussed above, to detect whether parallel or serial communication formats are in use.

In general, a device, such as the master device 40 of FIGS. 4A and 4B, may include a transmitter that is capable of communicating in either serial or parallel communication formats, or both. In at least one embodiment, the master device 40 may program or initialize the device 10 using a serial communication, such as MIPI, SPI, or I2C protocols, for example, which may allow a faster rate of information transfer than a parallel communication (e.g., GPIO), to achieve a faster initialization of the device 10. Thereafter, the transmitter of the master device 40 may change to a parallel communication format, such as the case for GPIO, under normal operation (for example, when not programming or initializing the device 10). Potential benefits of using a parallel communication format during normal operation may include lower latency, better noise immunity, and less electromagnetic interference (EMI) generated by the communications. In at least one example, the higher rate serial communication is used during initialization, e.g., at the factory where a wireless device is manufactured, and a more robust parallel communication is used when the wireless device is deployed, i.e., normal use by a customer, in which case nearby electronics, particularly additional radio frequency (RF) electronics, may be in operation.

As discussed above, the detector 16 may detect any of the presence or lack of a serial clock, the presence or lack of high impedance or a disconnected terminal, a voltage threshold, training or signaling sequence, or any combination of these, to determine whether a parallel communication format or a serial communication format is in use. It is to be understood that a multi-mode communication interface in accord with aspects and embodiments disclosed herein may include any of the various types of a detector, or multiple of the various types of detectors, also disclosed herein. For example, a combination detector may be arranged to monitor a frequency on a first terminal while also monitoring an impedance on a second terminal, and further logic circuits may be provided to enable one of a serial receiver circuit or a parallel receiver circuit only when the characteristics on both the first terminal and the second terminal match as to which communication format is in use. Accordingly, a detector may monitor for any one or more features of a signal, voltage, or impedance on any one or more terminals in varying combinations to accommodate varying applications and operational requirements.

Additionally, multi-mode communication interfaces in accord with aspects and embodiments disclosed herein may further include two of the same type of receiver circuit, for example a low speed serial receiver circuit and a high speed serial receiver circuit, or may include more than two receiver circuits. For example, a multi-mode communication interface may include a low speed serial receiver circuit, a high speed serial receiver circuit, a three terminal parallel receiver circuit, and an eight terminal parallel receiver circuit, with each of the various receiver circuits sharing at least one terminal with another of the receiver circuits, and a detector may be provided to monitor one or more terminals for indications of which receiver circuit is appropriate to be enabled. Accordingly, any number, type, and arrangement of receiver circuits may be provided and controlled by enable signals from a detector provided to monitor for any one or more features of a signal, voltage, or impedance on any one or more terminals in varying combinations to accommodate varying applications and operational requirements, in accord with aspects and embodiments disclosed herein.

Additionally, the device 10 may include any number or type of devices. For example, the device 10 may be a modulator, a power amplifier, an electromagnetic coupler, an antenna switch module, a front end module, or any combination of these or other devices. The multi-mode communication interface 12 may allow communication with the device 10 to allow control of the device 10, such as, for example, to set modulation parameters, amplification levels, switch or impedance modes, etc. Additionally, the device 10 may be implemented as part of a module, a system-in-a-package (SIP), or a complete product such as a smartphone, tablet, router, wearable, bluetooth accessory, wi-fi access point, or other electronic device. The device 10 or the communication interface 12 may be implemented on a die, such as a silicon die or other semiconductor die, and may be part of a module or final product.

According to aspects, any of the multi-mode communication interfaces disclosed herein may be incorporated into various packages or modules to allow communication to a device, which may be incorporated into a commercial product. FIGS. 5-8 illustrate examples that can include any combination of features associated with the communication interfaces disclosed herein.

Figure 5:
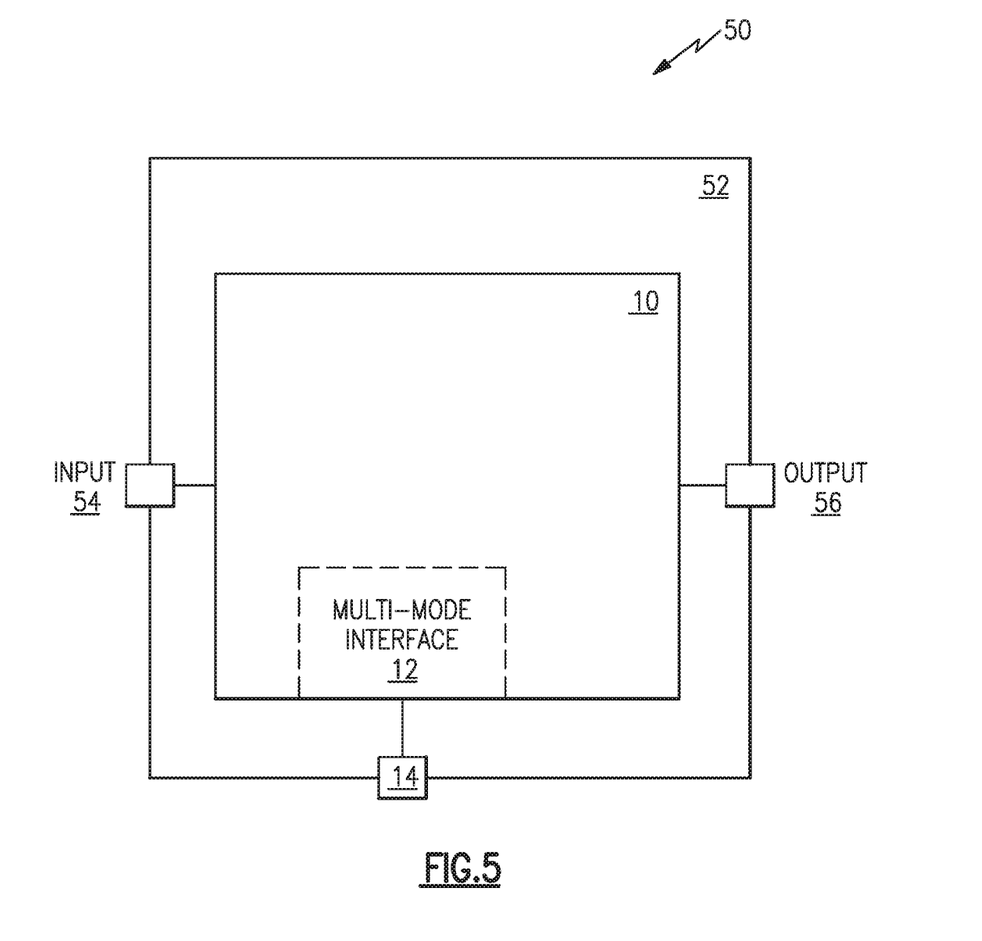
FIG. 5 is a block diagram of an example of a module that includes a device that incorporates a multi-mode communication interface.

FIG. 5 is a block diagram of an example of a module 50 that includes a device 10 as part of a die with a multi-mode communication interface 12. The module 50 may include a substrate 52 upon which the die with the device 10 is provided, and may include a packaging structure such as an overmold formed over the substrate 52 and dimensioned to substantially encapsulate the various dies and components thereon, including the device 10. The device 10 may be, for example, a power amplifier, a coupler, a sensor, a transceiver, an antenna switch module, a front end module, or any other device with which communications may be desirable. The module 50 may further include exterior connectivity to the device 10 and the communication interface 12 to provide signal interconnections, such as an input 54, an output 56, and one or more communication terminals 14. The connections may include contacts, wirebonds, solder bumps, balls, lands, pins, sockets, etc. The terminal 14 may include, for example, terminals 14a, 14b, and 14c as discussed above, and provides external connections to communicate to the multi-mode communication interface 12. There may be additional connections, and more or fewer inputs or outputs, depending upon the nature of the device 10.

Figure 6:
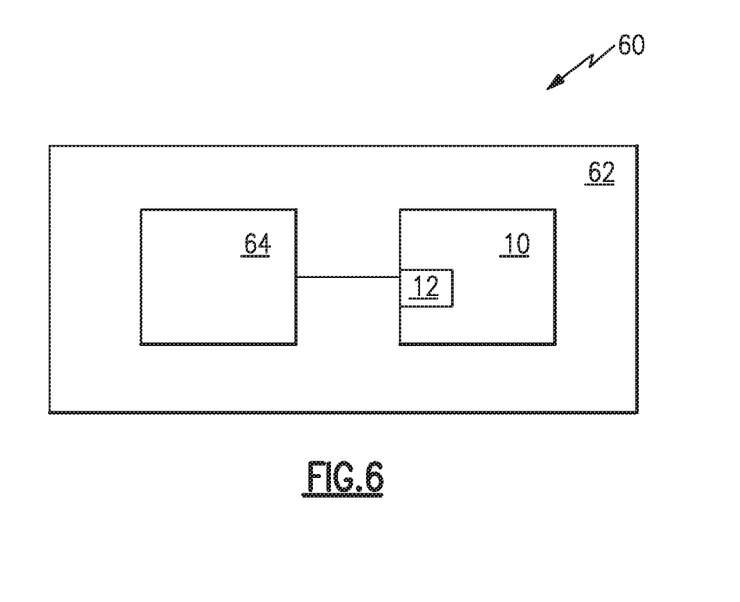
FIG. 6 is a block diagram of another example of a module that includes a device that incorporates a multi-mode communication interface.

FIG. 6 is a block diagram of another example of a module 60 that includes a device 10 as part of a die, with a multi-mode communication interface 12, provided on a substrate 62 and interconnected to another device 64 on its own die, also provided on the substrate 62. The module 60 may also include a packaging structure such as an overmold formed over the substrate 62 and dimensioned to substantially encapsulate the various dies and components thereon, including the device 10 and the device 64. The module 60 may further include exterior connectivity to the device 10 and/or the device 64, such as to provide one or more exterior signal connections. The example shown in FIG. 6 is illustrated without exterior access to the multi-mode communication interface 12, i.e., the multi-mode communication interface 12 is provided in this example to allow intra-module communication to the device 10 from the device 64.

Figure 7:
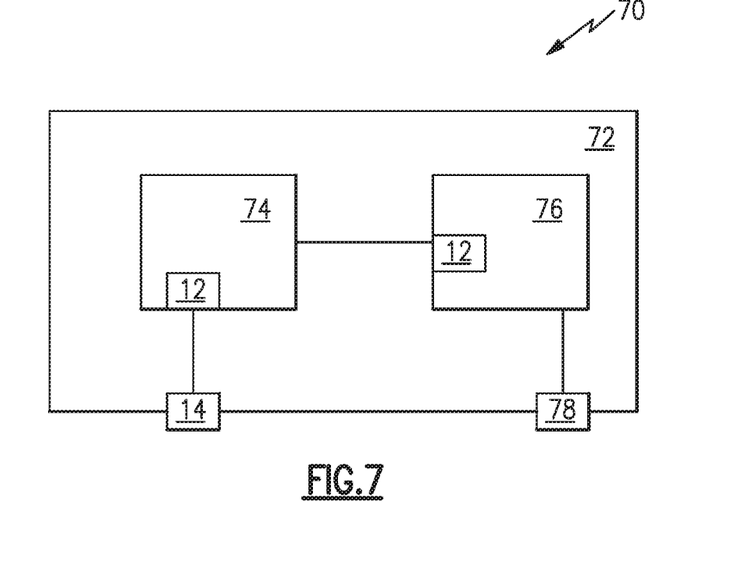
FIG. 7 is a block diagram of another example of a module that includes a device that incorporates a multi-mode communication interface.

FIG. 7 is a block diagram of another example of a module 70 that includes a substrate 72 upon which is provided a first die that includes a device 74 having a multi-mode communication interface 12 and a second die that includes a device 76 having a multi-mode communication interface 12. The devices 74, 76 are arranged so that the device 74 may receive communication from an external device, e.g., via one or more terminals 14, through a multi-mode communication interface 12 and the device 76 can receive communications from the device 74 through a multi-mode communication interface 12. Similar to the modules 50, 60 discussed above, the module 70 may include a packaging structure such as an overmold. Also shown is an additional exterior connectivity with the device 76 via one or more terminals 78. The example shown in FIG. 7 illustrates that any arrangement of devices may be provided with multi-mode communication interfaces 12 and may be provided in any arrangement of substrate, dies, packaging, connectivity, etc. suitable to accommodate varying applications and changing operational requirements.

Figure 8:
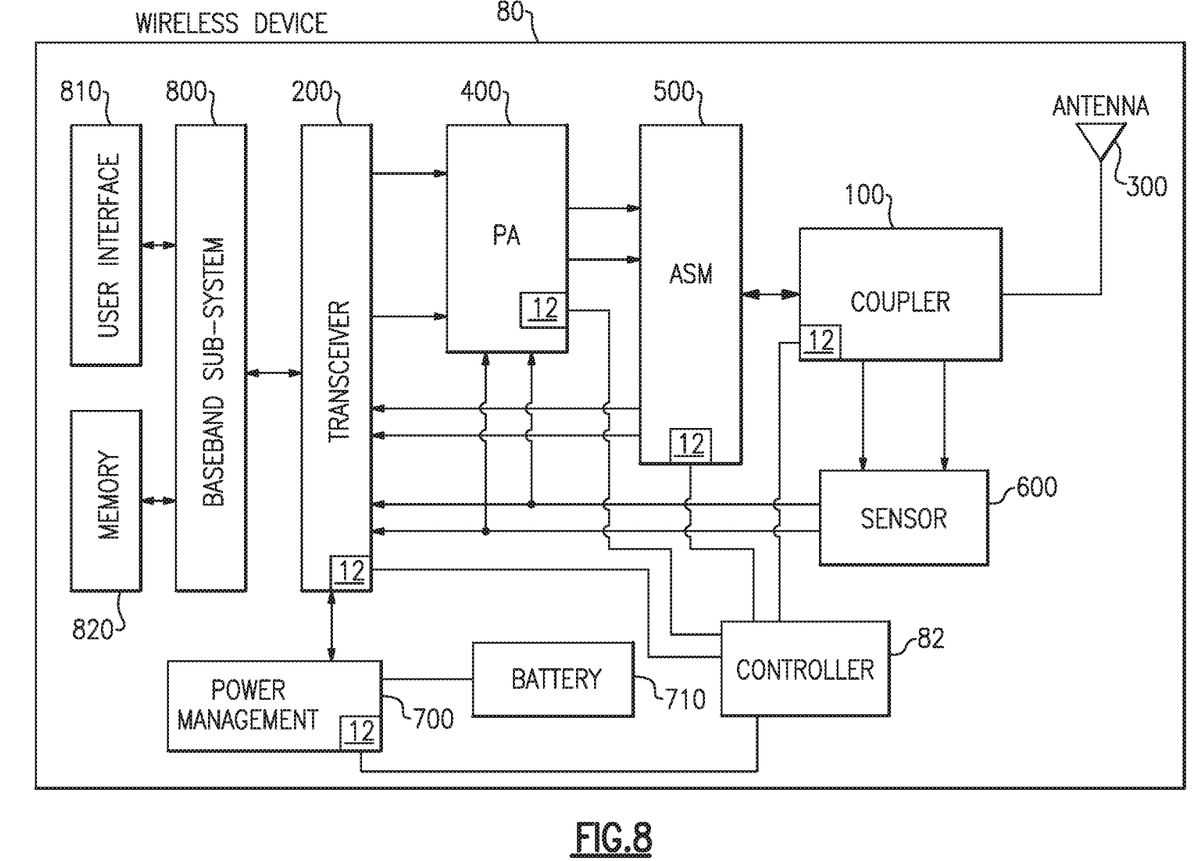
FIG. 8 is a block diagram of an example wireless device that may incorporate exemplary communication interfaces.

In embodiments, any device with a multi-mode communication interface may be incorporated into an electronic product. An example of such a product is shown in FIG. 8, which is a block diagram of a wireless device 80 that may incorporate one or more multi-mode communication interfaces as disclosed. The example wireless device 80 may be, for example, a mobile phone, a smart phone, a tablet, a wireless access point, a router, a modem, or the like.

In the example shown in FIG. 8, the wireless device 80 includes an antenna 300 for transmitting and receiving wireless radio frequency (RF) signals and a coupler 100 to provide a coupled signal to a sensor 600, the coupled signal being a portion of an RF signal going to or coming from the antenna 300. The sensor 600 may be used for monitoring and adjusting power levels and/or antenna mismatch characteristics. Additionally, an antenna switch module 500 may control or direct RF signals between the antenna 300 and a transceiver 200, and the antenna switch module 500 may control or direct RF signals from a power amplifier 400 to the antenna 300. The transceiver 200 may be controlled by a baseband sub-system 800 connected to a user interface 810 and a memory 820, and the wireless device 80 may have a power management system 500 and a battery 710.

One or more multi-mode communication interfaces 12 in accord with those disclosed herein may be incorporated in the wireless device 80 or in the various components shown in a number of configurations in accord with operational characteristics of the wireless device 80. Specifically, a communication interface may be incorporated in any one or more of the components of wireless device 80 to allow communication to the component which may in turn allow control of the component by, e.g., a controller 82, by allowing instructions, settings, and data to be sent to and/or read from the component. For example, the power amplifier 400 may incorporate a multi-mode communication interface 12 in accord with those disclosed herein so that the controller 82 may send control information to the power amplifier 400. Such control information may include gain settings and frequency bands in which to operate, for example. Additionally, a multi-mode communication interface 12 in accord with those disclosed herein may be incorporated into the coupler 100 so that it may receive controller 82 settings such as directionality, coupling factor, filtering frequency, and termination impedance values or switch settings, for example. In a further example, a multi-mode communication interface 12 in accord with those disclosed herein may be incorporated into the antenna switch module 500 to control directionality, band settings, or antenna selection, for example. Additional multi-mode communication interfaces in accord with those disclosed herein may be present, in various additional or alternative arrangements, and associated with the various components of the wireless device 80, to allow communication with and control of the various components according to their operational parameters or specific application. Multiple and various components could be combined in a front end module and share, via a control component, one or more multi-mode communication interfaces in accord with various embodiments disclosed herein.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A communication interface circuit comprising:
    a plurality of terminals to receive a communication, the plurality of terminals including a first terminal and a second terminal;
    a first receiver circuit coupled to the plurality of terminals, the first receiver circuit being configured to receive a first communication format;
    a second receiver circuit coupled to the plurality of terminals, the second receiver circuit being configured to receive a second communication format; and
    an interface detection circuit coupled to at least one of the plurality of terminals and coupled to the first receiver circuit and the second receiver circuit, the interface detection circuit configured to detect a frequency of a first signal received at the first terminal, determine whether the communication received by the plurality of terminals is in one of the first communication format and the second communication format based on the detected frequency of the first signal, and enable one of the first receiver circuit and the second receiver circuit based on the determination.

2. The communication interface circuit of claim 1 wherein the interface detection circuit is further configured to detect at least one of an impedance and a voltage of a second signal received at the second terminal of the plurality of terminals.

3. The communication interface circuit of claim 2 wherein the interface detection circuit is further configured to compare the detected impedance or voltage level to a threshold to further determine the first communication format and the second communication format.

4. The communication interface circuit of claim 1 wherein the first receiver circuit is configured to receive parallel data communication and the second receiver circuit is configured to receive serial data communication.

5. The communication interface circuit of claim 1 wherein the interface detection circuit is configured to enable one of the first receiver circuit and the second receiver circuit by default when the interface detection circuit cannot determine whether the communication received by the plurality of terminals is in one of the first communication format and the second communication format.

6. The communication interface circuit of claim 1 wherein the interface detection circuit is configured with a bias toward enabling one of the first receiver circuit and the second receiver circuit.

7. The communication interface circuit of claim 1 wherein the interface detection circuit is configured with a delay, the delay enforcing an amount of time the determination must remain unchanged before the interface detection circuit enables one of the first receiver circuit and the second receiver circuit based on the determination.

* * * * *